United States Patent
Numao et al.

(10) Patent No.: US 6,647,388 B2
(45) Date of Patent: Nov. 11, 2003

(54) ACCESS CONTROL SYSTEM, ACCESS CONTROL METHOD, STORAGE MEDIUM AND PROGRAM TRANSMISSION APPARATUS

(75) Inventors: Masayuki Numao, Kawasaki (JP); Michiharu Kudoh, Kanagawa-ken (JP); Tomio Amano, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 09/738,484

(22) Filed: Dec. 15, 2000

(65) Prior Publication Data

US 2001/0023421 A1 Sep. 20, 2001

(30) Foreign Application Priority Data

Dec. 16, 1999 (JP) ............................................. 11-358178

(51) Int. Cl.[7] ............................. G06F 17/30; G06F 9/00
(52) U.S. Cl. .......................... 707/9; 707/100; 707/102; 713/182; 715/513; 715/523
(58) Field of Search ............................. 707/9, 100, 102; 715/513, 523; 713/182, 201

(56) References Cited

U.S. PATENT DOCUMENTS

| | | | | |
|---|---|---|---|---|
| 5,239,648 A | * | 8/1993 | Nukui | 707/10 |
| 5,475,833 A | * | 12/1995 | Dauerer et al. | 707/201 |
| 5,826,250 A | * | 10/1998 | Trefler | 706/50 |
| 6,052,684 A | * | 4/2000 | Du | 707/8 |
| 6,105,027 A | * | 8/2000 | Schneider et al. | 707/9 |
| 6,275,941 B1 | * | 8/2001 | Saito et al. | 713/201 |
| 6,430,561 B1 | * | 8/2002 | Austel et al. | 707/9 |

* cited by examiner

*Primary Examiner*—Frantz Coby
*Assistant Examiner*—Cam Linh Nguyen
(74) *Attorney, Agent, or Firm*—William A. Kinnaman, Jr., Esq.; Blanche E. Schiller, Esq.; Heslin Rothenberg Farley & Mesiti P.C.

(57) ABSTRACT

It is one object of the present invention to use an access control process to evaluate under a specific condition an access permission request. An access control system 100 comprises a resource document 40 in which a policy description is stored; a policy evaluation module 10 for receiving an external request 110 for accessing the data file, for extracting, from the resource document 40, the policy description that is associated with target data for the access request 110, and for evaluating the policy description to determine whether or not the access request 110 is to be permitted; an enforcement function verification module 20 for, when an existing condition can not be evaluated using only the information included in the policy evaluation module 10, determining whether the condition can be evaluated or can be established; and an enforcement module 30 for evaluating or establishing the condition that, in accordance with the enforcement function verification module 20, can be evaluated or established.

19 Claims, 14 Drawing Sheets

Input/output data for each module

| Data Type | Components |
|---|---|
| Access Request | (Subject, Object, Role (or Uid), Operation) |
| External Condition | [Condition-List] |
| Enforcement Instruction | [Instruction-Set] |
| Resource Retrieval | XML Document |
| Policy Retrieval | XML Document (rule syntax) |
| Resource Update | XML Document |
| Access Deny | a string of "denied" |
| Resource Transcode | HTML, XML, string, etc. |

Fig. 3

Formats and expressions for data that are input to
and output by policy evaluation module 10

| Input/output | Data format |
|---|---|
| Access request | ● Parameter:<br>Subject: Data to identify the subject (user, etc.) that submitted an access request. A user ID, a role name, etc.<br>Object: Data to identity an access target. A data element name, etc.<br>Operation: Data to identify an operation for an access target. Reading, writing, etc.<br><br>● Definition:<br>An access request is issued to determine whether the Subject has the right of Operation for the Object.<br>● Specific example:<br>Subject: Nihon Taroh/IBM/Japan<br>Object: http://admin.trl.com//form/expense.xml<br>Operation: read(html)<br><br>● Example expression for access request by Prolog:<br>query(user(Nihon Taroh/IBM/Japan),<br>     'http://admin.trl.com//form/expense.xml',<br>     read(html)). |
| Access control policy rule | ● Parameter:<br>Subject: Data to identify an access permitted user.<br>Object: Data to identity an access target.<br>Operation: Data to identify an access permitted operation.<br>Condition: Description of a condition for permitting an access.<br>● Definition:<br>Rule according to which, when a condition described in the Condition is established, the Subject has the right of Operation for the Object.<br>● Specific example:<br>Subject: employee<br>Object: http://admin.trl.com//form/expense.xml<br>Operation: read(html)<br>Condition: transcode(in, out)<br><br>● Example expression for access request by Prolog:<br>acl(_,role(employee),'http://admin.trl.com//form/expense.xml',<br>    read(Format)) :- transcode(Nihon Taroh.xml, Format). |

Fig. 6

Formats and data expressions that are input to
and output by policy evaluation module 10

| Input/output | Data format |
|---|---|
| Environment data | ● Parameter: <br> Environment: A list of facts that are true in policy evaluation module. Arbitrary fact. <br><br> ● Definition: <br> Environment is regarded as true at the time of policy evaluation. <br> ● Specific example: <br><br> A fact that a user "Nihon Taroh/IBM/Japan" can occupy role of "employee." <br><br> ● Example expression for access request by Prolog: <br> Environment(role(Nihon Taroh/IBM/Japan, employee). |
| External condition | ● Parameter: <br> ExternalCondition: A list of assumptions in the policy evaluation module that have neither been proven true nor been proven false. <br> ● Definition: <br> ExternalCondition means a condition, selected from among the conditions for the access control policy rule, that can not immediately be determined to be true or false by using environment data or the system function of the policy evaluation module. <br> ● Specific example: <br> An external condition as to whether expense.xml can be converted into html. <br><br> ● Example expression for access request by Prolog: <br> transcode(expense.xml, html). |

Fig. 7

Data format used by the enforcement function
verification module 20

| Input/output | Data format |
|---|---|
| Capability Repository (information concerning the enforcement module 30) | ● Parameter :<br>Condition Expression : Condition portion of an access request under a condition.<br>Capability : Presence/absence of a component that can handle a condition.<br>Component Name : A component that processes a condition.<br>Component Argument : The argument for a component.<br>● Definition :<br>Condition Expression is the expression form for a condition that is described in an access control policy for the processing of a condition.<br>Capability is a flag used to indicate whether the Capability Check component is valid or invalid.<br>Component Name is a program component for processing a condition. Represented by URL.<br>Component Argument is an argument used by a component. Represented by the argument of Condition Expression or URL.<br><br>● Specific example :<br>Condition Expression: transcode_type_1(*.xml, html)<br>Capability Check: Available<br>Component Name: c:¥tools¥jar¥enforcer1.jar<br>Component Argument: c:¥enforcement¥transcode_type_1.xsl |

Fig. 9

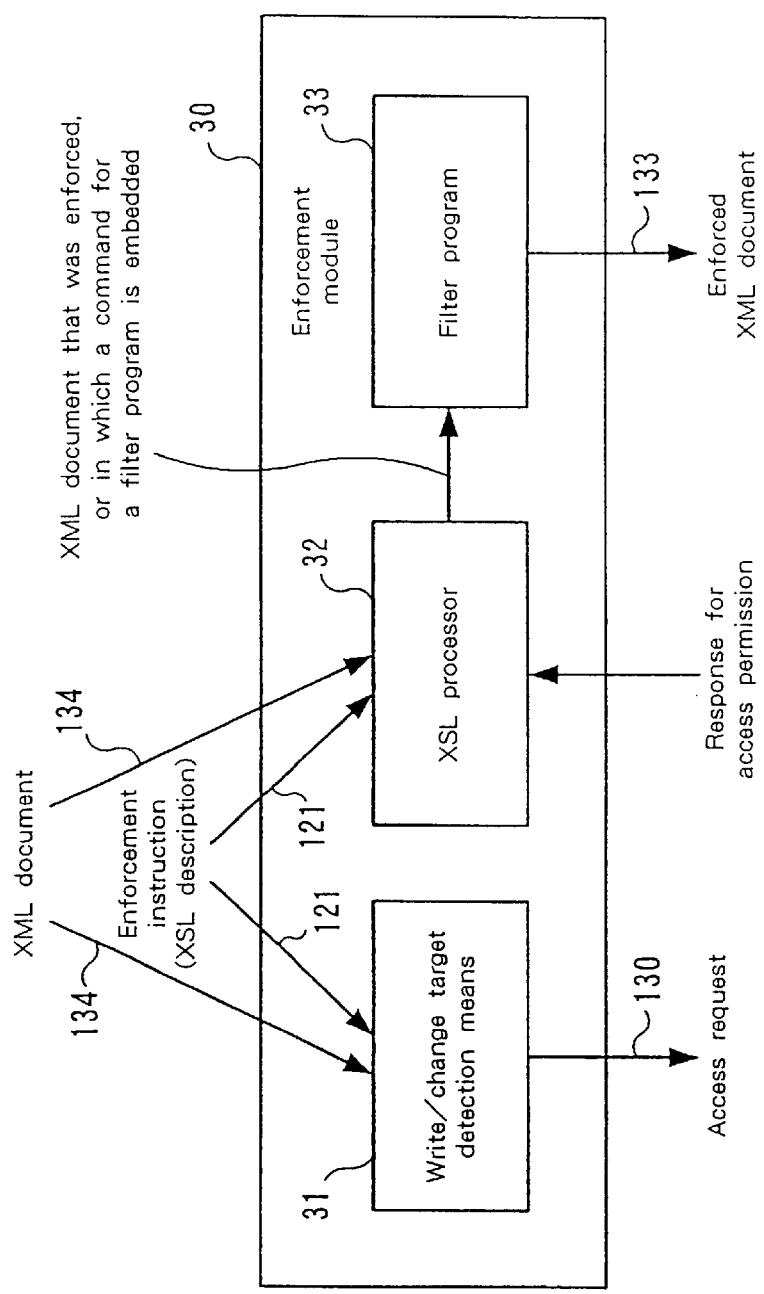

Enforcement description example using XSL

```
<xsl:template match="/">
 <xsl:copy>
  <xsl:apply-templates select="*|@*|comment() |pi() |text()"/>
 </xsl:copy>
 <Log disclosedto="&Subject;">
 <xsl:for-each select="//Order[PartsName[. ='GR Head']]">
  Parts Name :GR Head
  Quantity  :<xsl:value-of select="Quantity"/>
  Deliverly Due:<xsl:value-of select="DeliverlyDate"/>
 </xsl:for-each>
 </Log>
</xsl:template>
</xsl:stylesheet>
```

Example enforcement process using XSL processor

```
<OrderList>
<Order>
<PartsName>Spindle Motor</PartsName>
<PartsNo>1134</PartsNo>
<ProductType>Micro Drive D-type</ProductType>
<Quantity>200</Quantity>
<DeliverlyDate>1999/06/21</DeliverlyDate>
</Order>
  :
</Order>
</OrderList>
```

```
<OrderList>
<Order>
<PartsName>Spindle Motor</PartsName>
<PartsNo>1134</PartsNo>
<ProductType>Micro Drive D-type</ProductType>
<Quantity>200</Quantity>
<DeliverlyDate>1999/06/21</DeliverlyDate>
</Order>
  :
</Order>
</OrderList>
<Log disclosedto="XYZ Corp. ">
   Parts Name    :GR Head
   Quantity      :200
   Deleverly Due:1999/06/21
   Parts Name    :GR Head
   Quantity      :300
   Deleverly Due:1999/07/21
</Log>
```
} Added log Table of enforcement module

| Condition Expression | Capability | Component Name |
|---|---|---|
| makelog/1 | ○ | log_processor |
| get_timestamp/2 | ○ | timestamp_processor |
| verify_signature/1 | ○ | signature_processor |
| formula_expression | ○ | formula_processor |

Fig. 14

ACCESS CONTROL SYSTEM, ACCESS CONTROL METHOD, STORAGE MEDIUM AND PROGRAM TRANSMISSION APPARATUS

PRIOR FOREIGN APPLICATION

This application claims priority from Japanese patent application number 11-358178, filed Dec. 16, 1999, which is hereby incorporated herein by reference in its entirety.

1. Technical Field

The present invention relates to a method for evaluating policy descriptions for access control, and for enforcing a condition portion for implementing the policy descriptions.

2. Background Art

Conventional, well known policy description means for accessing a data file are, for example, KeyNotes [BFIK99] (PolicyMaker [BRL96]), GACL [WL93] [WL98] and ASL [JSSB97] by ATT. These policy descriptions, which are rules used to determine whether to permit access, are based on a list of three elements (Subj, Obj, Op) that is called an access control list (ACL). This means that a subject (Subj) of an access is permitted to perform a specific operation (Op) for an access target (Obj). Therefore, in order to respond to all access requests, ACLs must be prepared for all possible combinations of the three.

To simplify the access control policy, the above policy description means describes pattern matching using a variable, and introduces the rule ACL(subj, Obj, Op)←Cond (subj, Obj, Op) in order to write a condition formula for limiting a variable. That is, since it is difficult and requires too much effort to prepare, in response to an access request, ACLs that correspond to each combination of three elements, an abstract of the policy is created by using a variable, and upon the receipt of a relevant access request for the variable, access control is exercised in accordance with a corresponding ACL.

Two different methods are used when describing an operation performed for a control target on an ACL: a method by which only operations that are permitted are described, and a method by which both operations that are and operation that is not permitted are described. The first method is used with the Closed World Assumption. According to the Closed World Assumption, when the applicable interpretation is that no available ACL corresponds to a particular access request, the specified operation is not permitted. Therefore, when in an ACL only those operations that are permitted are described, and an access request does not match any entry in the ACL, the requested operation is rejected unconditionally. The second method is used for GACL, and in this case, the Default assumption is that an operation is permitted so long as a distinctly negative operation is not requested.

Although policy evaluation methods may differ in various respects, all of the conventional policy evaluation systems return an evaluation decision as a binary, Yes or No, result. In other words, a value of 1 or 0 is returned in reply to a question ?-ACL(subj, obj, op).

As is described above, according to the policy evaluation techniques used for conventional access control, a policy evaluation performed in response to an access request produces a simple binary result, either Yes or No. That is, in response to an access request, the conventional technique determines only whether access should or should not be permitted. Thus, the conventional technique is not sufficiently flexible, and it can not provide a conditional response, such as a Yes (a conditional Yes) that is dependent on the establishment of a specific state.

Therefore, generally it is not possible to provide complicated access control that is dependent on various conditions, such as: the issuing of an instruction to permit access, the embedding of an electronic watermark in data that are read or the writing of an access log when data encoding or format conversion is to be performed, or the issuing of an instruction to permit access when a time condition is the controlling factor.

SUMMARY OF THE INVENTION

To resolve the above technical shortcomings, upon the receipt of an access request, one object of the present invention, when exercising access control, is not only to determine, basically, whether access should or should not be permitted, but also to evaluate for acceptability an access request for which access permission is dependent on the establishment of a specific condition.

It is another object of the present invention to recurrently evaluate a specific condition if it is requested that a condition that is being evaluated to grant access permission under a condition should establish the specific condition.

To achieve the above objects, according to the present invention, an access control system comprises: a resource document in which a policy description is stored that is associated with data stored in a data file; policy evaluation means for receiving an external request for accessing the data file, for extracting, from the resource document, the policy description that is associated with target data for the access request, and for evaluating the policy description to determine whether or not the access request is to be permitted; enforcement function verification means for, when an existing condition is such that the policy description can not be evaluated using only the information included in the policy evaluation means, determining whether the condition can be evaluated or can be established; and enforcement means for evaluating or establishing the condition that, in accordance with the enforcement function verification means, is capable of being evaluated or established.

A plurality of the enforcement means can be provided in accordance with the evaluation or the establishment of the condition, which can not be evaluated using only the information included in the policy evaluation means. When the plurality of enforcement means are provided, the enforcement function verification means further determines whether a condition that one of the enforcement means has received from the policy evaluation means can be evaluated or established. This arrangement is preferable because the contents of a condition can be coped with flexibly. For the verification process to be performed by an enforcement means that can evaluate or establish a condition, a list can be employed in which a component of the enforcement means and a condition governing an operation that the pertinent component can enforce are stored in correlation with each other.

When access of a different data portion is required in order to evaluate or establish a condition that is determined by the enforcement function verification means can be evaluated or established, the enforcement means issues, to the policy evaluation means, a request to access the different data portion. Upon the receipt of the access request from the enforcement means, as well as upon the receipt of an external access request, the policy evaluation means evaluates a policy description that is associated with data to be accessed. This arrangement is superior in that an access request can be recurrently issued to evaluate or establish the condition. The data portion may be either a different portion of a document to be accessed or a predetermined portion of another document.

The enforcement means includes: writing/alteration target detection means for detecting a data portion in the data file that is a target for writing or alteration, and for issuing an access request to the policy evaluation means; and writing/alteration execution means for, when in response to the access request access permission is received from the policy evaluation means, writing or altering the data portion, wherein the writing/alteration execution means prepares a desired function by using a plug-in. This arrangement is preferable because a complicated process for evaluating or establishing a condition can be flexibly coped with by adding a corresponding function using a plug-in. When an access target is an XML document, the writing/alteration execution means can be an XSL processor, which is a standard tool for reading XML data, and a conversion rule, for generating new XML data. In this case, plug-in software can be added to carry out a complicated process.

An access control method, for receiving an external request for accessing a predetermined data file and for evaluating a policy description associated with the data that are to be accessed to determine whether or not the access request is to be permitted, comprises the steps of: receiving an access request and obtaining a policy description that is associated with the data that are to be accessed; evaluating a condition in the obtained policy description; determining, when a condition that can not be currently evaluated is present in the policy description, whether a process that satisfies the condition is capable of being enforced; performing the process that satisfies the condition when it is ascertained that the process is capable of being enforced; and employing, after the process that satisfies the condition has been performed, the evaluation results for all the conditions in the policy description to determine whether or not the access that is requested is to be permitted. The process that satisfies the condition is a process for evaluating or establishing the pertinent condition.

The step of evaluating the conditions in the policy description includes the steps of: comparing a parameter of the access request with a rule in the policy description, and detecting a matching rule; evaluating condition portions in the rule that is detected; and when the condition portions of the rule can not be currently evaluated, collecting the condition portions and moving to a step at which whether a process for satisfying the condition portions is capable of being performed is determined.

The access control method further comprises the step of: employing, when a plurality of rules that match the parameter of the access request are detected before the performance of the step of evaluating the condition portions of the rule in the policy description, a predetermined rule to determine a priority order for evaluating the rule. With this arrangement, an appropriate rule can be applied when there are a plurality of rules that match the condition. The priority order may be determined in accordance with a priority that is provided for a policy rule. When as rules that match the same condition there are a policy rule for inhibiting access and a policy rule for permitting access, the policy rule that inhibits access may be employed first in order to prevent the careless granting of access permission.

The step of determining whether the process that satisfies the condition in the policy description is capable of being performed includes the steps of: receiving the set of the conditions that have been prepared, at the step for evaluating the condition in the policy description, for the rule that can not be evaluated based only on information in the policy description, and extracting the conditions separately; determining whether a function has been prepared for performing a process that satisfies each of the conditions; and calling the function for performing the process that satisfies the condition when it is ascertained that the function has been prepared. To determine whether the function for performing the process that satisfies the condition has been prepared or not, the above described list can be employed wherein a component of the enforcement means and a condition that the pertinent component can enforce are stored in correlation with each other.

The step of performing the process that satisfies the condition in the policy description includes: employing the function that is called at the step of determining whether the process that satisfies the condition in the policy description can be enforced, and detecting, based on the condition of the policy description, a data portion in a predetermined data file for writing or for alteration; issuing a request for an access required for the writing or the alteration; and writing data to the data portion or changing the data portion upon the receipt of access permission in response to the request for the access that is required in order to perform the writing or the alteration. The data portion is another portion of a document to be accessed, or a predetermined portion of another document.

According to the present invention, a storage medium is provided on which a program is stored that can be read by input means of a computer, the program permitting the computer to perform: a process for receiving an access request to externally access a predetermined data file, and for obtaining a policy description that is associated with the data that are to be accessed; a process for evaluating a condition in the obtained policy description; a process for determining, when a condition that can not be currently evaluated is present in the policy description, whether a process that satisfies the condition is capable of being enforced; a process for performing the process that satisfies the condition when it is ascertained that the process that satisfies the condition is capable of being enforced; and a process for employing, after the process that satisfies the condition has been performed, the evaluation results for all the conditions in the policy description to determine whether or not the access that is requested is to be permitted. With this arrangement, a computer that has loaded the program can evaluate the granting of access permission under an applicable condition.

In order to perform the process that satisfies the condition in the policy description, the program permits the computer to perform: a process for employing the function that is called at the step of determining whether the process that satisfies the condition in the policy description can be enforced, and for detecting, based on the condition of the policy description, a data portion in a predetermined data file for writing or for alteration; a process for issuing a request for an access required for the writing or the alteration; and a process for writing data to the data portion or changing the data portion upon the receipt of access permission in response to the request for the access that is required in order to perform the writing or the alteration. With this arrangement, in order to satisfy an applicable condition, a computer that has loaded this program can recurrently issue a request to obtain access permission under the condition.

According to the present invention, a program transmission apparatus comprises: storage means for storing a program that permits a computer to perform a process for receiving an access request to externally access a predetermined data file, and for obtaining a policy description that is associated with the data that are to be accessed, a process for evaluating a condition in the obtained policy description, a process for determining, when a condition that can not be currently evaluated is present in the policy description, whether a process that satisfies the condition is capable of being enforced, a process for performing the process that satisfies the condition when it is ascertained that the process that satisfies the condition is capable of being enforced, and a process for employing, after the process that satisfies the condition has been performed, the evaluation results for all the conditions in the policy description to determine whether or not the access that is requested is to be permitted; and transmission means for reading the program from the storage means and transmitting the program. The thus arranged program transmission apparatus can provide the technique of the present invention as a program provision form for a client that does not have a storage medium, such as a CD-ROM.

In order to perform the process that satisfies the condition in the policy description, the program stored in the storage means permits the computer to perform: a process for employing the function that is called at the step of determining whether the process that satisfies the condition in the policy description can be enforced, and for detecting, based on the condition of the policy description, a data portion in a predetermined data file for writing or for alteration; a process for issuing a request for an access required for the writing or the alteration; and a process for writing data to the data portion or changing the data portion upon the receipt of access permission in response to the request for the access that is required in order to perform the writing or the alteration.

Furthermore, according to the present invention, an access control system comprises: means for storing a policy description including a condition whereby reading of information written by a single source is permitted when format conversion is possible; means for, upon the receipt of a predetermined access request that matches the policy description, determining whether a function to establish the condition for the format conversion is included, and for, when it is ascertained that the function is included, calling and executing the function to establish the condition; and means for, when the function to establish the condition is executed, permitting an access in response to the access request. With this arrangement, the access can be permitted with transcoding serving as a condition.

Further, according to the present invention, an access control system comprises: means for storing a policy description including a condition whereby reading of information is permitted when an electronic watermark is to be embedded in a document to be accessed; means for, upon the receipt of a predetermined access request that matches the policy description, determining whether a function for embedding an electronic watermark to establish the condition is included, and for, when it is ascertained that the function is included, calling and executing the function to establish the condition; and means for, when the function to establish the condition is executed, permitting an access in response to the access request. With this arrangement, the access can be permitted under a condition for embedding of an electronic watermark serving as one mode of transcoding. It should be noted that the same process can be performed for the encoding of a document as another mode for transcoding.

Furthermore, according to the present invention, an access control system comprises: means for storing a policy description including a condition whereby accessing of a target document is permitted when an access history is to be written to the target document; means for, upon the receipt of a predetermined access request that matches the policy description, determining whether a function for writing the access history to the target document to establish the condition is included, and for, when it is ascertained that the function is included, calling and executing the function to establish the condition; and means for, when the function to establish the condition is executed, permitting an access in response to the access request. With this arrangement, the access can be permitted under a condition where an access history is written to the document.

The function for writing the access history to the document further comprises: means for recurrently issuing requests to access a document to write the access history. With this arrangement, while the recurrent accesses of the document to write the access history can be an evaluation target for access permission, the security can be improved. The target for the writing of the access history can be the document to be accessed, or a part of another document.

In addition, according to the present invention, an access control system comprises: means for storing a policy description including a condition whereby accessing of a target document is permitted when a time stamp of an access is to be written as an access history to the target document; means for, upon the receipt of a predetermined access request that matches the policy description, determining whether a function for writing the time stamp as the access history to the target document to establish the condition is included, and for, when it is ascertained that the function is included, calling and executing the function to establish the condition; and means for, when the function to establish the condition is executed, permitting an access in response to the access request. With this arrangement, the access permission is strictly granted under a time condition.

According to the present invention, an access control system comprises: a resource document in which a policy description is stored that is associated with data stored in a data file; policy evaluation means for receiving an external request for accessing the data file, for extracting, from the resource document, the policy description that is associated with target data for the access request, and for evaluating the policy description to determine whether or not the access request is to be permitted; and enforcement function verification means for performing another process to determine whether the condition can be evaluated or can be established. Operations required to evaluate or establish a condition that can not be evaluated using only the information owned by the policy evaluation means are the data form conversion of a data file to be accessed, and the operation for maintaining the access history of the data file to be accessed. That is, only when these operations can be executed, can an access request be granted for which this condition is the policy description.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 is a table for defining the contents of data that are input to and output by the individual modules of the access control system.

FIG. 6 is a diagram for explaining the formats and expressions used for an access request and a policy rule selected from among the data that are input to and output by the policy evaluation module 10.

FIG. 7 is a diagram for explaining the formats and expressions for environment data and an external condition selected from among the data that are input to and output by the policy evaluation module 10.

FIG. 9 is a diagram for explaining the format of data used by the enforcement function verification module 20.

FIG. 10 is a diagram for explaining an example arrangement of an enforcement module 30.

FIG. 12 is a diagram for explaining a description used for maintaining an access log in a document in an example wherein writing to a log file is performed during a data operation.

FIG. 13 is a diagram for explaining where a log is added to a document in accordance with the description in FIG. 12.

FIG. 14 is a diagram for explaining an example table that is used by the enforcement function verification module 20 to verify the enforcement module 30.

DESCRIPTION OF THE SYMBOLS

Figure 1:
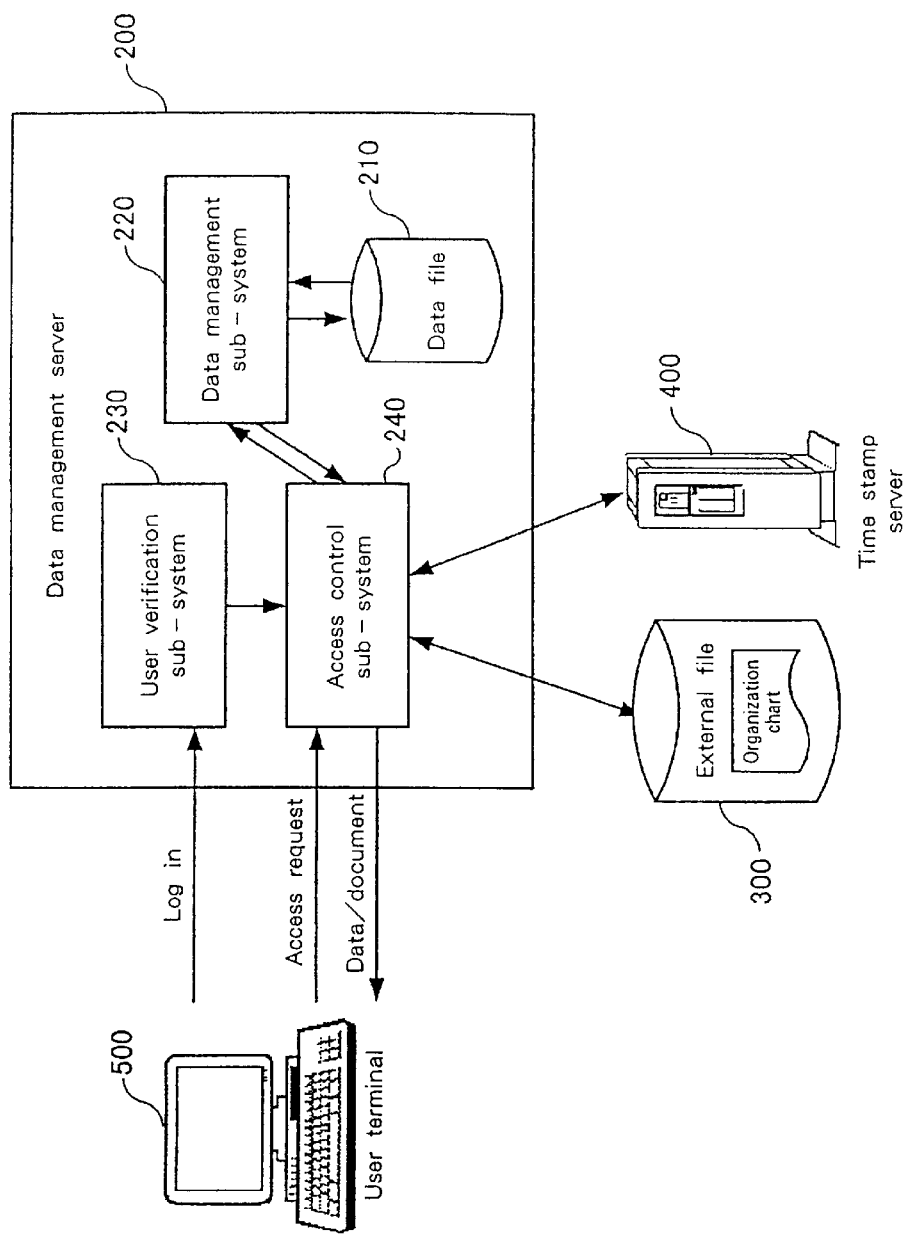
FIG. 1 is a diagram for explaining the arrangement of a data management server on which an access control system is mounted according to one embodiment of the present invention.

10: Policy evaluation module
20: Enforcement function verification module
30: Enforcement module
40: Resource document
100: Access control system
200: Data management server
210: Data file
220: Data management sub-system
230: User verification sub-system
240: Access control sub-system

BEST MODE FOR CARRYING OUT THE INVENTION

The preferred embodiment of the present invention will now be described in detail while referring to the accompanying drawings.

As an overview of the present invention, the results of a policy evaluation performed in the access control are represented not by a conventional binary decision of Yes or No, but by a multi-valued decision using Boolean algebra, and an intermediate value is interpreted as, "Yes, if this condition is established." Thus, a frame is provided that can generally represent the policy evaluation process and the enforcement of a condition to carry out the policy. For this, the policy description for access control is extended into the If-then rule, and the partial evaluation method is employed to evaluate a logical language. The If portion is used for checking the condition and for an actual instruction. Therefore, the policy description can be simplified and rendered declarative, and the matching of the overall policy can be determined within the frame of the logical language.

FIG. 1 is a diagram for explaining the arrangement of a data management server on which an access control system according to this embodiment is mounted. In FIG. 1, a data management server 200 comprises: a data file 210, in which data and documents to be accessed are stored; a data management sub-system 220, for managing data and documents and for providing services, such as search; a user verification sub-system 230, for permitting only registered users to employ the function of the data management server 200; and an access control sub-system 240, for, in conjunction with the user verification sub-system 230, receiving only specific access requests from registered users and for exercising access control to ensure that the users receive services available from the data management sub-system 220. The data management server 200 receives from an external source the data and the documents that are to be managed, and various user associated data that are employed for the access control provided by the access control sub-system 240. In FIG. 1, the chart of the organization to which a user belongs is requested in order to acquire the user's ID from a predetermined external file 300, and time information is obtained from a time stamp server 400.

A user who desires to access data, or a document stored in the data management server 200, first accesses the user verification sub-system 230 of the data management server 200 from a user terminal 500 and logs in to the system. At this time, the user verification sub-system 230 examines a password, for example, to determine whether it was submitted by a registered user (an entity permitted to access data or documents managed by the server).

Then, the user issues an access request for desired data to the access control sub-system 240. The access control sub-system 240 employs log-in information received from the user verification sub-system 230, the contents of the access request, and the provisions of the security policy for access control to determine whether or not permission should be granted. At this time, as needed, the organization chart and the time information are input for the access permission determination.

When access permission is granted by the access control sub-system 240, pertinent data or a document is read from the data file 210 by the data management sub-system 220 and is transmitted, via the access control sub-system 240, to a user terminal 500. While a detailed description of the operation will be given later, here it should be noted that the access control sub-system 240 can convert the obtained data, or in accordance with the contents of the policy description, can add history information (a log file, etc.) to the original data.

Figure 2:
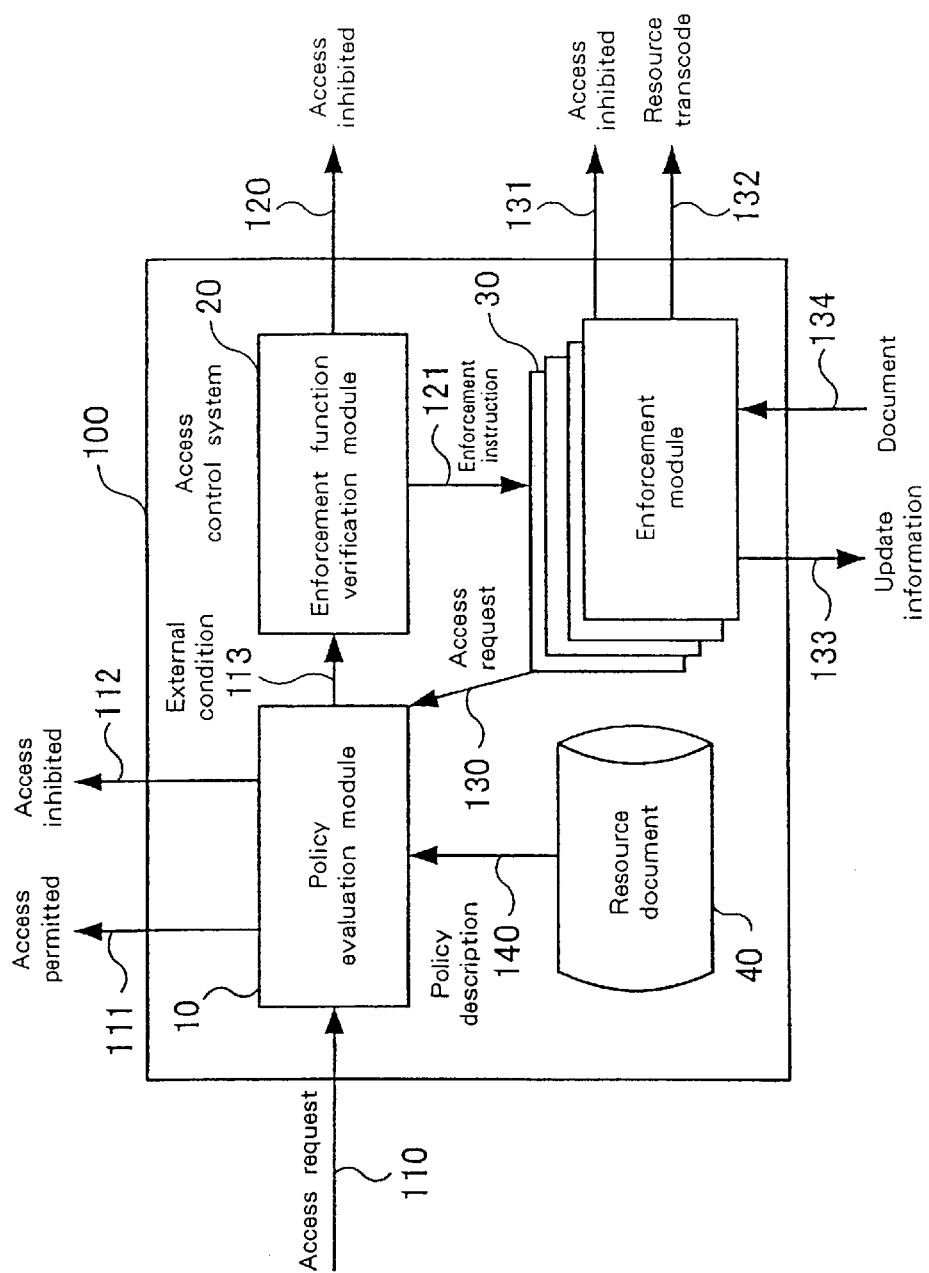
FIG. 2 is a diagram for explaining the overall arrangement of the access control system according to the present invention.

FIG. 2 is a diagram for explaining the overall arrangement of the access control system according to the embodiment. An access control system 100 in FIG. 2 corresponds to the access control sub-system 240 in FIG. 1. In FIG. 2, a policy description evaluation module 10 receives an access request, and evaluates a policy description that is associated with the data that are to be accessed. When a condition (hereinafter referred to as an external condition) included in the policy description that is to be evaluated can not be evaluated using only the information included in the policy evaluation module 10, an enforcement function verification module 20 determines whether the evaluation or the establishment of the external condition is possible. Then, if the enforcement function verification module 20 determines evaluation or establishment is possible, the evaluation or the establishment of the external condition is performed by an enforcement module 30, a plurality of which can be provided in accordance with the results obtained by the evaluation or the establishment of the external condition. When multiple enforcement modules 30 are provided, the enforcement function verification module 20 performs an examination to determine whether any of the enforcement modules 30 can evaluate or establish the external condition received from the policy description module 10. The final component is a resource document 40 that stores a policy description associated with the data that are to be accessed. In the access control system 100, which is implemented by a computer, the above described individual modules, which in operation are comparable to program modules, are used to perform functions that permit the computer to perform the individual processes.

FIG. 3 is a table for defining the contents of data that are input to and output by the modules 10, 20 and 30. While referring to FIG. 3, the structure of an access request 110 or 130 that is input to the policy evaluation module 10 is (Subject, Object, Role (or Uid), Operation). The structure of external condition information signal 113, which is transmitted by the policy evaluation module 10 to the enforcement function verification module 20, is a condition list {Condition-List}. The structure of an enforcement instruction 121, which is transmitted by the enforcement function verification module 20 to the enforcement module 30, is a data set {Instruction-Set} instructing the enforcement of an operation. A policy description 140, which is read from the resource document 40 by the policy evaluation module 10, a document 134, which is transmitted by the data file 210 in FIG. 1, via the data management sub-system 220, to the enforcement module 30, and update information 133, which is transmitted by the enforcement module 30, via the data management sub-system 220, to the data file 210, are XML documents. Access inhibited data strings 112, 120 and 131, which are respectively output by the policy evaluation module 10, the enforcement function verification module 20 and the enforcement module 30, are data strings ("denied" strings) that are transmitted when access is denied. An access permitted data string 111, which is output by the policy evaluation module 10, is a data string (a "permission" string) that is transmitted when access is permitted. And a resource transcode document 132, which is output by the enforcement module 30, is a document such as an HTML or XML document, or a data string (an HTML or XML string, etc.).

Figure 4:
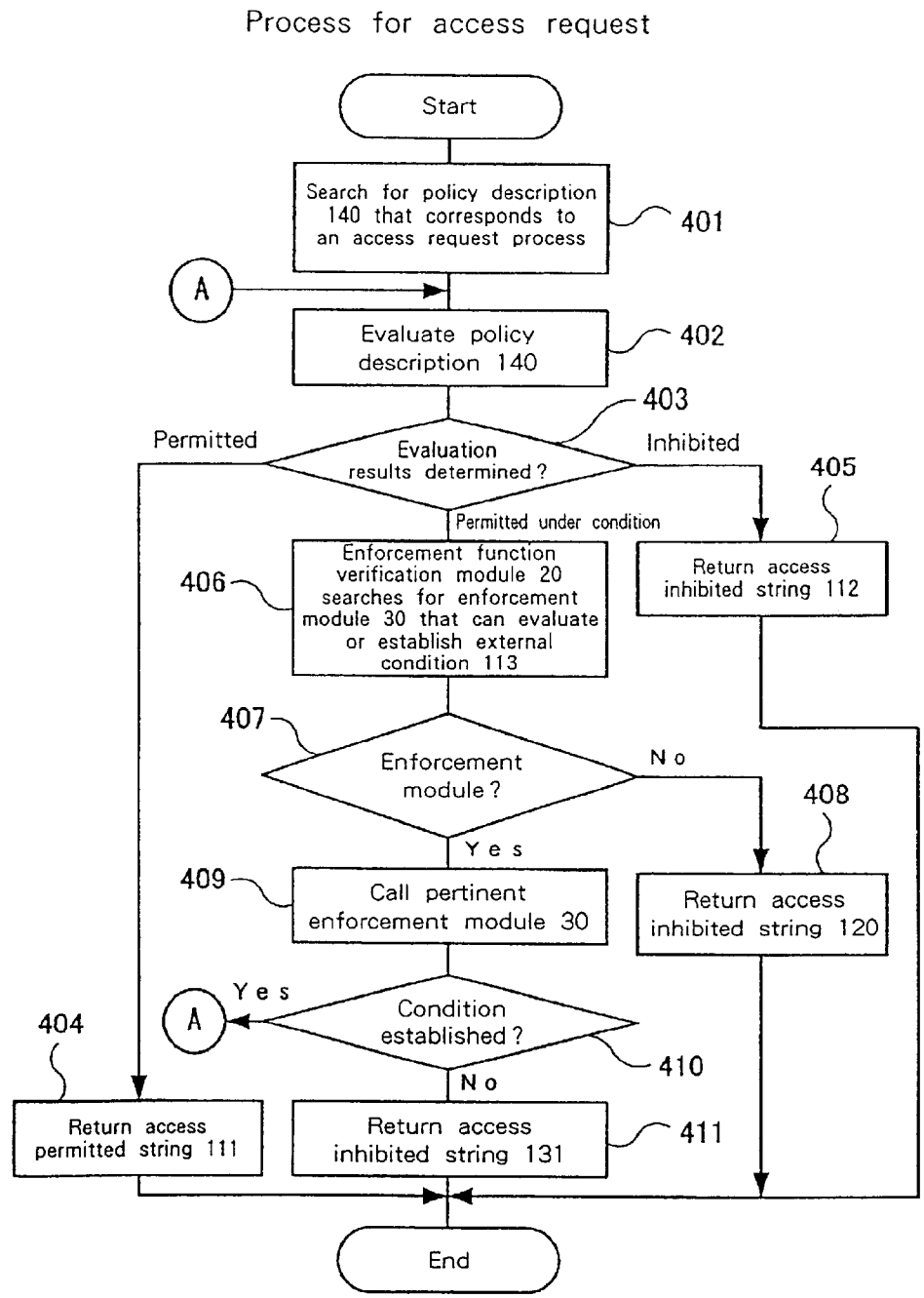
FIG. 4 is a flowchart for explaining the processing performed by the access control system to handle an access request.

FIG. 4 is a flowchart for explaining the processing performed by the access control system 100 in FIG. 2 when handling an access request.

The processing sequence in FIG. 4 is initiated upon the receipt of an access request 110 from a user, or is recurrently begun upon the receipt of an access request 130 that is secondarily issued by a specific enforcement module 30 during the processing performed to handle the access request.

Upon receiving the access request 110 or 130, the policy evaluation module 10 detects, from the resource document 40, a policy description 140 that corresponds to the document that is to be accessed (step 401), and performs an evaluation of the extracted policy description 140 (step 402). When all the conditions in the policy description 140 are permissible, in accordance with the evaluation results, either an access permitted data string 111 or an access inhibited data string 112 is returned to the user who issued the access request (steps 403, 404 and 405).

When a condition included in the policy description 140 is one for which the policy evaluation module 10 can not provide a final evaluation, it is ascertained that conditional permission is applicable, and the external condition information 113 is transmitted by the policy evaluation module 10 to the enforcement function verification module 20 (step 403).

Available at the enforcement function verification module 20 is a list of the various enforcement modules 30 that are provided for the system. Thus, upon the receipt of the external condition information 113, the enforcement function verification module 20 searches for an enforcement module 30 that can evaluate or establish the external condition (step 406). When no appropriate enforcement module 30 is found, an access inhibited data string 120 is returned to the user who issued the access request 110 (steps 407 and 48).

When an appropriate enforcement module 30 is found that can evaluate or establish the external condition, the pertinent enforcement module 30 is called and the evaluation or the establishment of the external condition is performed (steps 407 and 409). When, as a result of an evaluation, the enforcement module 30 determines that access permission for the external condition is appropriate, or if the enforcement module 30 can successfully establish the external condition, the resource transcode document 132 is transmitted, and the policy evaluation module 10 proceeds with the evaluation of another condition in the policy description 140 (step 410). When all the conditions in the policy description 140 have been evaluated and access permission has been verified, an access permitted data string 111, together with the resource transcode 132 extracted by the enforcement module 30, is transmitted to the user who issued the access request 110.

However, when, as a result of an evaluation, the enforcement module 30 determines that access permission for the external condition should be inhibited, or if the enforcement module 30 fails to establish the external condition, an access inhibited data string 131 is transmitted to the user who issued the access request 110 (step 411).

In the processing performed by the enforcement module 30, when access to another document, or to another section in a document to be accessed, is required in order to establish an external condition, an access request 130 can be issued to the policy evaluation module 10 to repeat the evaluation of the external condition. When the repeated access request that is issued to establish the external condition is defined as an evaluation target for access permission, an evaluation at another level can be performed, and the security can be improved.

Further, when in order to establish an external condition the enforcement module 30 requires personal information, such as the structure of an organization a user belongs to or an access date, the required information can be obtained by accessing a file or a server that can provide this information.

The functions of the individual modules will now be described in detail.

Figure 5:
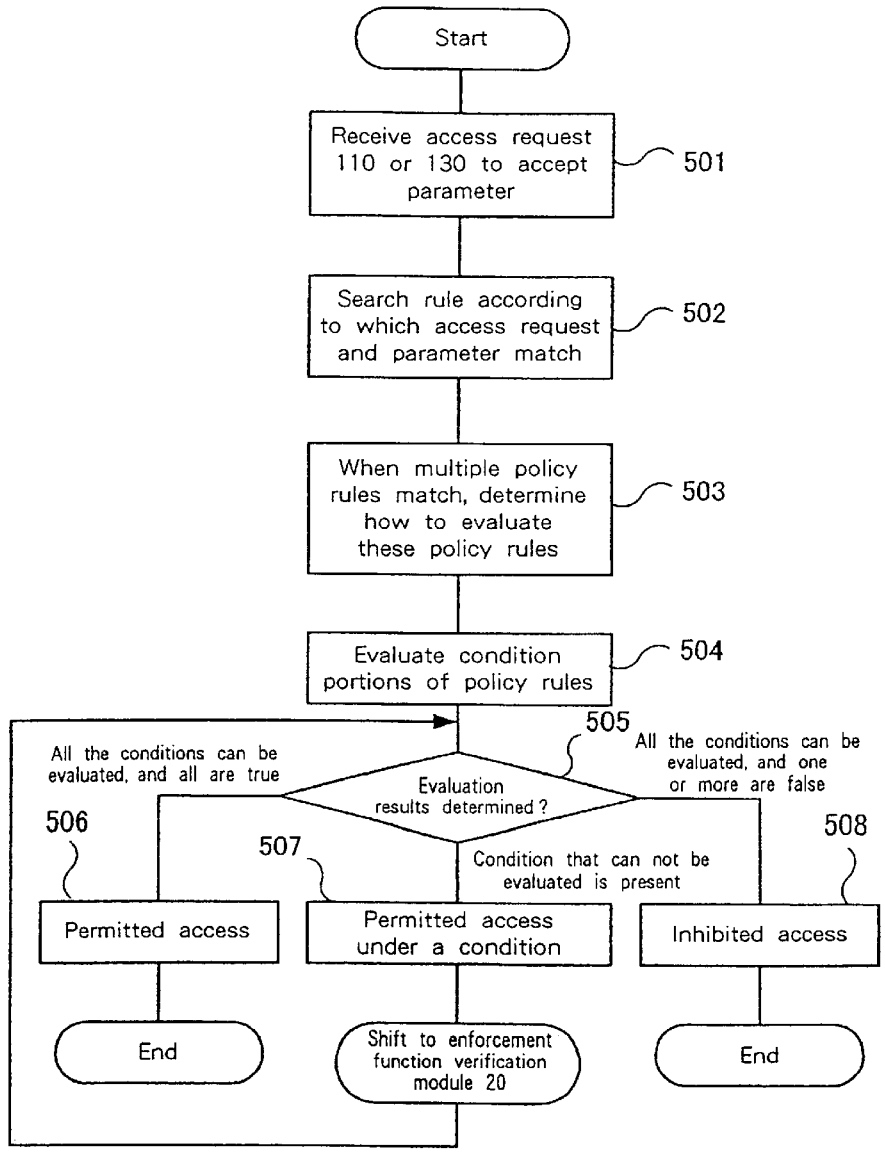
FIG. 5 is a flowchart for explaining a policy evaluation algorithm used by a policy evaluation module 10.

FIG. 5 is a flowchart showing a policy evaluation algorithm used by the policy evaluation module 10. FIGS. 6 and 7 are diagrams for explaining an example format and an example expression used for data that are input to or output by the policy evaluation module 10.

In FIG. 5, an access request 110 is input and parameters are accepted (step 501). By referring to the column occupied by an access request in FIG. 6, the format can be determined for an access request 110 that employs, as parameters, Subject, which is data used to identify the subject (a user, etc.) by which the access request was submitted; Object, which is data used to identify an access target; and Operation, which is data used to identify an operation to be performed for the access target. These parameters convey the meaning, "Subject requests use of Object to perform an Operation (access right)." A specific access request example is shown in FIG. 6. In this example an access request is submitted wherein the Subject submitting the access request is Nihon Taroh/IBM/Japan, the Object is http://admin.trl.com//form//expense.xml, and the Operation is read (html). The meaning conveyed by this access request is, "A user who logged in as "Nihon Taroh/IBM/Japan requests permission to read, in HTML form, the file expense.xml stored in the admin.trl.com server." For this processing, the access request 110 is input, and the same activities are performed as are performed when an access request 130 output by the enforcement module 30 is received.

Then, a rule that matches all the parameters (Subject, Object and Operation) in the access request is searched for in the access control policy description that is stored in the resource document 40 (step 502). The detected policy rule 140 is input, and by referring to the column for the access control policy rule in FIG. 6 it can be determined that for the policy rule format, employed as parameters are Subject, which is data used to identify a user for which access is permitted; Object, which is data used to identify a target for which access is permitted; Operation, which is data to identify an access permission operation; and Condition, which is a description of a condition under which access permission is granted. Together these parameters constitute the rule, "When the description in Condition is established, Subject possesses the right to perform an Operation using Object." A specific example for the policy rule is shown in FIG. 6, wherein Subject is an employee, Object is http://admin.trl.com//expense.xml, Operation is read(html), and Condition is transcode (in, out). The meaning conveyed by the policy rule is, "So long as data can be converted into HTML, a user or an application filling the role of "employee" (has right to access data) is permitted to read file expense.xml stored in the admin.trl.com server."

Here, "matching" means that the values of Subject, Object and Operation are matched. For example, when the Subject in the access evaluation request parameter is "amano," the rule whereby user ID "amano" and group name TRL, which includes "amano," are described is extracted from the access control policy rules.

During the search of the access control policy rule, environment data that are stored in the resource document 40 are also received in order to look for matching parameters. By referring to the column for the environment data in FIG. 7, the format for environment data employs, as a parameter, Environment, which is a list of facts or an arbitrary fact that in the policy evaluation module is true. This parameter means that "Environment is regarded as true in the policy evaluation." A specific example for the environment data is shown in FIG. 7, and in this example, the fact that user Nihon Taroh/IBM/Japan can fill the role of "employee" is included as environment data. It is apparent that when the environment data is applied for the examples for the access request and policy rule in FIG. 6, user "Nihon Taroh/IBM/Japan, which is included in the access request, satisfies the condition in the policy rule for the user who can fill the role of "employee" in the policy rule.

In the rule examination process, when a plurality of policy rules are matched at step 502 a method for evaluating these policy rules is determined (step 503). For example, when priorities are assigned for the policy rules, the policy rules are rearranged in the order of their priorities so that a correct evaluation can be made, or a rule for providing a preference for access inhibited rather than access permitted is prepared, and the policy rules are sorted into two types and are thereafter rearranged. Thus, the careless granting of access permitted can be prevented. The process performed when there are no matched rules is also determined at this step. For example, for a closed policy, access inhibited is determined unconditionally.

The condition portions of the policy rules that are processed at step 503 are then evaluated (step 504). When a condition using a value that is present in the resource document 40 is described in a condition portion of the policy rules, the pertinent value is extracted from the resource document 40. In a condition portion, a condition based on a value extracted from the resource document 40 is regarded as one that must be evaluated.

The results obtained at step 503 are used for the evaluation of conditions (step 505). When all the conditions can be evaluated and all the conditions are evaluated as true, an access permitted determination is made (step 506). When all the conditions can be evaluated and one or more conditions are evaluated as false, an access inhibited determination is made (step 508).

When there are conditions that can not be evaluated, an external condition is prepared under the terms of which access permitted determinations can be made for the conditions that could not be evaluated, and program control is shifted to the enforcement function verification module 20 (step 507). By referring to the column for the external condition in FIG. 7, it can be seen that the format for the external condition employs, as a parameter, ExternalCondition, a list, in the policy evaluation module 10, of assumptions that have neither been proven true nor been proven false. This parameter means "In accordance with Condition of the access control policy rule, a condition that can not immediately be determined to be true or false by using the environment data and the system function of the policy evaluation module." A specific example of the use of the external condition is shown in FIG. 7. As a result of an evaluation of the access request and the policy rule in FIG. 6, the external condition for determining whether expense.xml can be converted into HTML is transmitted from the policy evaluation module 10 to the enforcement function verification module 20.

When program control is shifted to the enforcement function verification module 20, program control is returned, via the enforcement module 30, to the policy evaluation module 10, which thereafter determines whether a final evaluation can be made. It should be noted, however, that, as will be described later, when the enforcement function verification module 20 or the enforcement module 30 ascertains that the external condition can not be evaluated or established, program control is not returned to the policy evaluation module 10 and an access inhibited determination is made.

Figure 8:
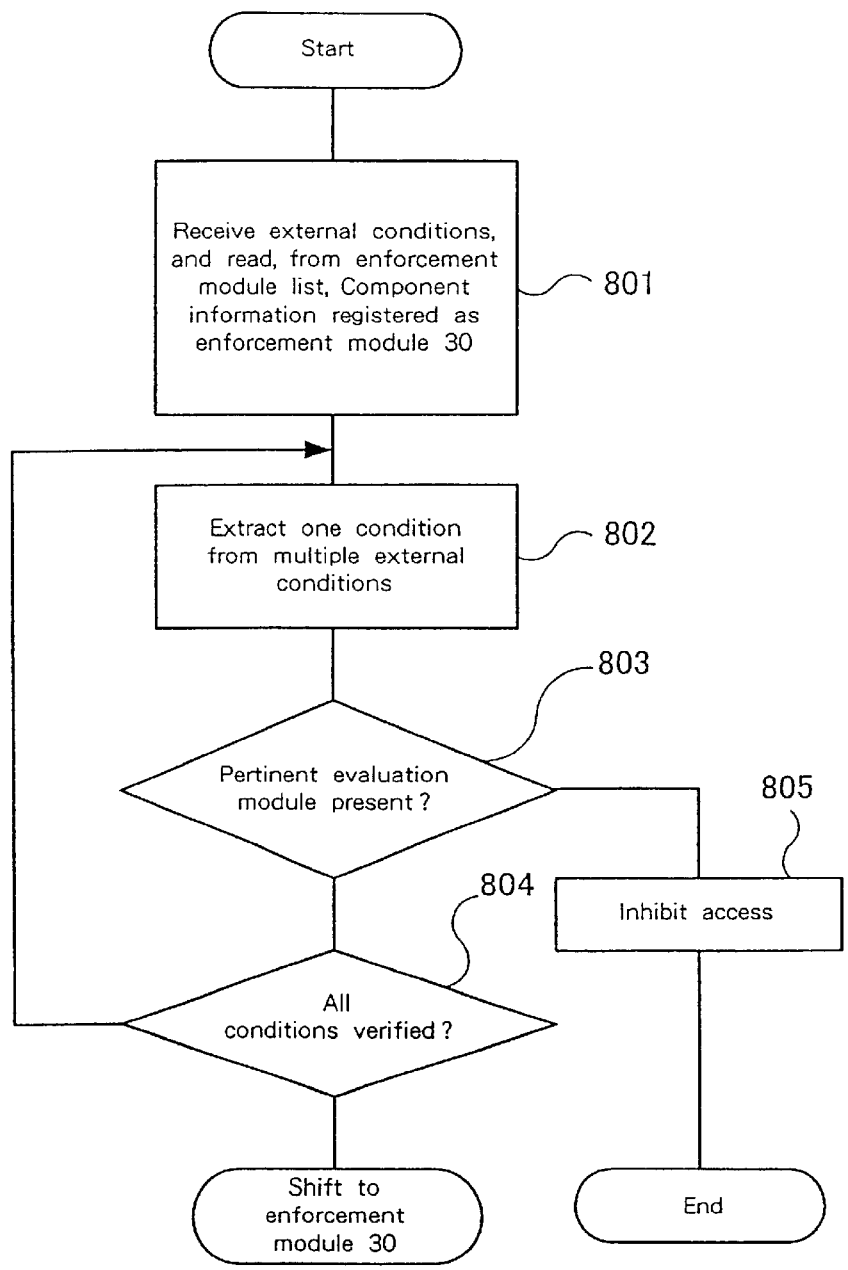
FIG. 8 is a flowchart for explaining an enforcement function verification algorithm used by an enforcement function verification module 20.

FIG. 8 is a flowchart for explaining an enforcement function verification algorithm used by the enforcement function verification module 20, and FIG. 9 is a diagram for explaining the format for data used by the enforcement function verification module 20.

While referring to FIG. 8, first, information for the external condition is received from the policy evaluation module 10 and is used for making an access permitted determination under a condition, and information for Component, which is registered as the enforcement module 30, is read from the enforcement module list stored in the enforcement function verification module 20 (step 801). While referring to FIG. 9, the format used for the information for the enforcement module 30 that is obtained from the enforcement module list, employs, as parameters, Condition Expression, which is a condition portion of an access request under a condition; Capability, which indicates the presence/absence of a component that can handle the condition; Component Name, which is a designated component that processes the condition; and Component Argument, which is the argument for the component. A specific example of the information as it concerns the enforcement module 30 is shown in FIG. 9, wherein the information that is presented for Condition Expression is transcode#type#1(*.xml, html), for Capability Check is Available, for Component Name is c:¥tools¥jar¥enforcerl.jar, and for Component Argument is c:¥enforcement¥transcode#type#1.xsl. What these information entries mean is, "The Enforcement mechanism that establishes the external condition 'transcode#type#1' can be employed, and data are processed by providing the 'transcode#type#1.xsl' parameter file for the 'enforcerl.jar' program, so that the condition can be established."

Multiple conditions that are input as external conditions are extracted one by one (step 802). A check is performed with each to determine whether an entry that satisfies the condition extracted at step 802 is included in the Condition Expression obtained at step 801 (step 803). If such an entry is included, the next condition is compared with Condition Expression. This process is repeated until all the conditions that constitute the external condition have been compared (step 804).

If an entry that satisfies the condition is not included in even one of the conditions that constitute the external condition, the access inhibited data string 120 is output, and the processing is thereafter terminated (step 805).

If an entry that satisfies the condition is detected for all the conditions that constitute the external condition, i.e., if all the parameters for the external condition are examined, program control shifts to the processing performed by the enforcement module 30. The format of the enforcement instruction 121 issued to the enforcement module 30 consists of a plurality of lists of combinations of Component Name and Component Argument included in the information that is read from the enforcement module list. For example, ((lotusxsl.jar, transcode.xsl) (domhash.jar, signature.xml)).

FIG. 10 is a diagram for explaining an example arrangement of the enforcement module 30. While referring to FIG. 10, the enforcement module 30 includes a writing/change target detection means 31, an XSL processor 32, and a filter program 33 that can be plugged in.

The writing/change target detection means 31 detects a portion in an XML document for which writing or conversion can be performed. The XSL processor 32 is a standard tool for reading XML data and a conversion rule, and for generating new XML data. The filter program 33 executes an instruction for handling the contents that the XSL processor 32 can not process. A desired function can be added by employing a plug-in.

In the processing handled by the enforcement module 30, a specific conversion is performed for the XML document in the data file 210 to obtain another XML document. The enforcement instruction 121, which refers to specific portions of the enforcement processing, is expressed as XSL data used to describe the conversion rule employed for the XML document.

Figure 11:
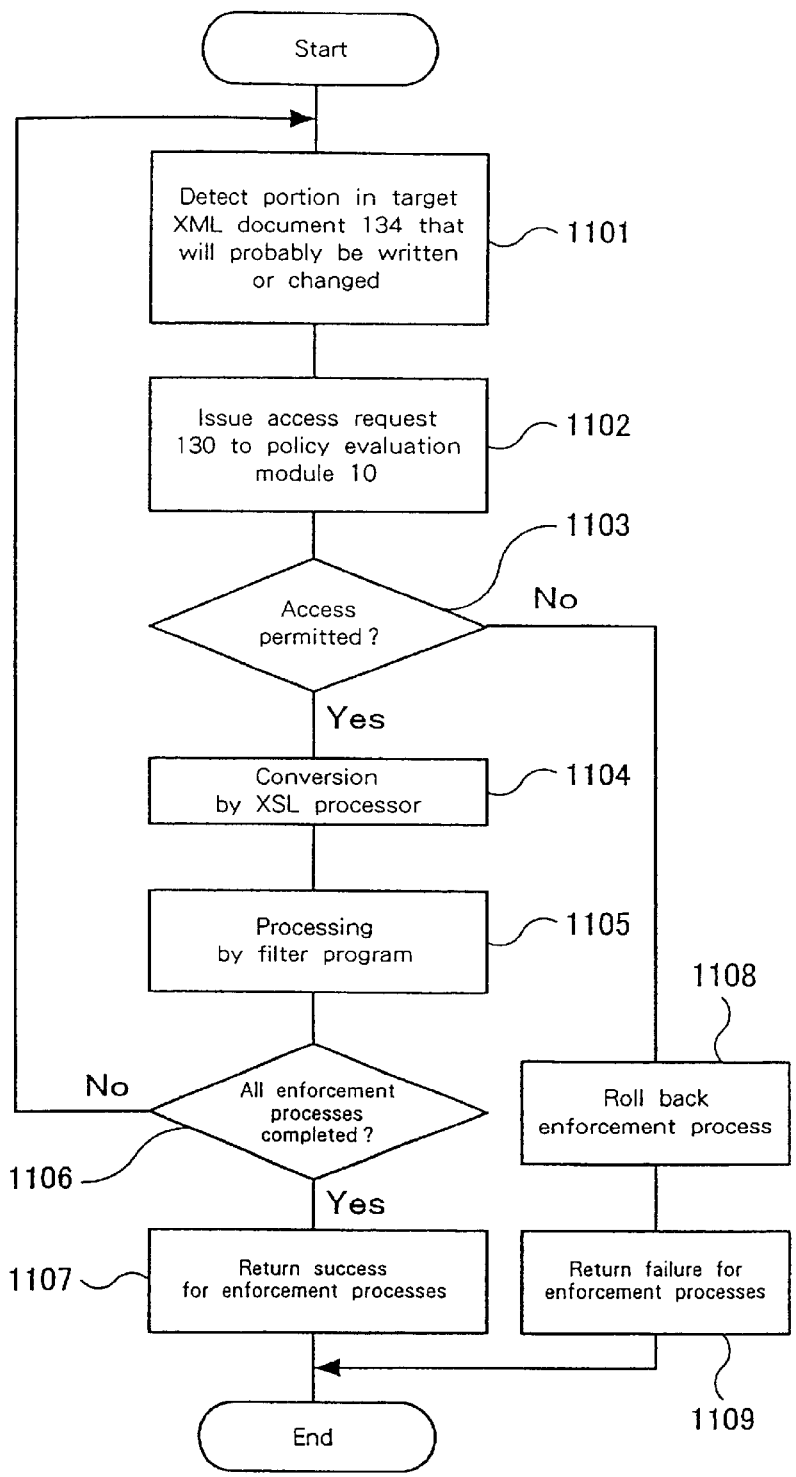
FIG. 11 is a flowchart for explaining the enforcement processing performed by the enforcement module 30.

FIG. 11 is a flowchart for explaining the enforcement processing performed by the enforcement module 30. In accordance with FIG. 11, the writing/change target detection means 31 analyzes the conversion rule (enforcement instruction 121) that is expressed using XSL, and detects a portion of the target XML document that may be written to or changed (step 1101). Since the enforcement process is performed by the enforcement module 30 in order to establish a condition required for the evaluation of the first access request 110, the XML document to be converted is not always an access target for the access request 110. For example, the XML document can be an additional file that is associated with the target data file of the access request 110. The detection of the target to be written or changed is performed by a trial application of the conversion rule to the target document 134, and by comparing the tree structures of the resulting document 134 and the original document. When the writing of addition data or the changing of original data becomes necessary as a result of the enforcement of an instruction, the access request 130 is issued as an inquiry to the policy evaluation module 10 (step 1102). Thereafter, the pertinent processing is continued only if access permission is received from the policy evaluation module 10 (step 1103).

When access is inhibited by the policy evaluation module 10, the processing that was being performed in accordance with the enforcement instruction is halted and the process is returned to its original state, or the data for which the temporary processing was performed are not written back to the resource document 40 (step 1108), and the enforcement function verification module 20 and the policy evaluation module 10 are notified that the attempt to establish the condition failed (step 109). The processing is thereafter terminated. In this case, neither the evaluation nor the establishment of the pertinent condition is possible, and for the access request, an access inhibited string 131 is output.

When access is permitted by the policy evaluation module 10, the XSL processor 32 performs the conversion of the XML document 134 (step 1104). But when a detailed enforcement procedure, such as encoding or watermarking, can not be directly accomplished using XSL, the XSL processor 32 inserts only an encoding or watermarking instruction into the XML document 134, and the actual processing is subsequently performed by an appropriate filter program 33 (step 1105).

When all the conversions included in the enforcement instruction 121 have been accomplished, the enforcement module 30 notifies the enforcement function verification module 20 and the policy evaluation module 10 of the establishment of the condition (steps 1106 and 1107). The processing is thereafter terminated. The XML document data obtained by the XSL processor 32 and the filter program 33 are again stored, via the data management sub-system 220, as updated information 133 in the data file 210, or are transmitted, together with the access permission response 111, as the resource transcode 132 to the transmission source of the access request 110.

A specific example application of the embodiment will now be described.

An explanation will be given for an example wherein the embodiment is employed for the transcoding of data. The transcoding of data is a process during which the format of information written by a single source is converted in accordance with the security level of an access request source and the capabilities of a communication channel and a display device, and the obtained information is transmitted. In this example, a policy is described whereby when a reading request is issued to prepare written information based on XML (names representing the definitions of individual fields are written using XML tags), reading is permitted using an HTML form that is not as re-usable. The policy rule is written, for example, as follows.

acl(*, role(employee), doc(http://trl.ibm.com/xmlform/X), read(Form))≦transcode (X, xml, Form).

Assume that an access request is issued to obtain a travel expense application form via HTML. This access request is written as follows.

?-acl(amano, role(employee)
doc(http://trl.ibm.com/xmlform/travelExpenseAccount.xml), read(html)).

In this case, role(employee) is matched as Subject, both in the policy description and the access request, and Object in the access request is
doc(http://trl.ibm.com/xmlform/travelExpenseAccount.xml) and is included in Object in the policy description,
doc(http://trl.ibm.com/xmlform/X). However, since Condition 'transcode(X, xml, Form)' is provided for Operation 'read(html)', the evaluation obtained by the policy evaluation module 10 is access permission for which a condition applies. The external condition that the policy evaluation module 10 transmits to the enforcement function verification module 20 is a condition according to which access is permitted if an XML form can be converted into an HTML form. The external condition is described as follows.
transcode(travelExpenseAccount.xml, xml, html)

Therefore, if the access control system 100 includes the enforcement module 30, which can convert a target form written in XML into an HTML form, the access is permitted. When such an enforcement module 30 is prepared, the XSL description is provided for the enforcement module 30 to convert the target form written in XML into the HTML form. The XSL processor 32 processes the XSL description and the original form data to generate HTML data for display. The obtained HTML data are thereafter transmitted to the user who issued the access request.

An example wherein the above embodiment is employed to insert an electronic watermark into a document will now be described. This process can be a modification of the transcoding process. Specifically, a condition is prepared whereby access is permitted if the ID of a user who has submitted an access request is embedded in an image/X as a policy description. The rule that includes this condition is written as follows.

acl(user(ID), role(subscriber),
doc(http://trl.ibm.com/image/X), read)≦embed(X, ID).

When a detailed enforcement procedure, such as a complicated electronic watermarking process, can not be written directly, the XSL processor 32 inserts, into a target document, only an instruction for the embedding of an electronic watermark. The actual embedding process for the electronic watermark is subsequently performed by a special filter program 33. The same method can be employed to execute an instruction for providing a condition whereby access is permitted if a data file is encoded.

An explanation will now be given for an example for which the embodiment is used for the writing of a data operation in a log file. For the access control system it is important that auditability be ensured. For this, it is convenient to provide a configuration that maintains a log (history) for an operation for which specific data are used. In this example, a case wherein a log is required is described as a policy, and this policy is enforced. The policy description is as follows.

acl(user(ID), role(issuer),
doc(http://trl.ibm.com/xmlform/X), write(*))≦status(log (ID, issuer, X, write, T)).

Assume that the following access request is issued for this policy description.

?-acl(amano, role(issuer)
doc(http://trl.ibm.com/xmlform/travelExpenseAccount.xml#linp utfield), write("cost= $100")).

In this case, role(issuer) is matched as Subject both in the policy description and in the access request, and Object in the access request is
doc(http://trl.ibm.com/xmlform/travelExpenseAccount.xml#linp utfield) and is included in Object in the policy description, doc(http://trl.ibm.com/xmlform/X). However, since Condition 'status(log(ID, issuer, X, write, T)' is provided for Operation "write("cost= $100")," it is assumed that the following rules are provided for "status."
status(log(Subj, Role, Obj, Op, T))≦log(Subj, Role, Op, T).
status(log(Subj, Role, Obj, Op, T))≦makelog(Subj, Role, Op, T).

Since the status data "log" is not yet written, the first rule of "status" fails. The second rule is employed, and access is permitted under a condition makelog(. .).

Upon the receipt of the "makelog" request, the enforcement module 30 analyzes a corresponding enforcement instruction 121, and detects that writing to the original data is required. To obtain write permission, the enforcement module 30 transmits the access request 130 to the policy evaluation module 10. The access request 130 is written as follows.

?-acl (sys1, role (system)
doc(http://trl.ibm.com/xmlform/travelExpenseAccount.xml#log) , write(log(amano, issuer, travelExpenseAccount.xml#issuerField, write("cost= $100"))).

The access permission or inhibition provided in response to the access request 130 is determined by again evaluating the policy rule. When access is permitted, a log is written, and if the condition is established, access is also permitted for the original access request. Therefore, in response to the original access request, the log is stored in a document that is to be accessed.

The actual process for writing a log is described as a conversion rule between XML documents, as well as in transcoding. For example, the description (written in accordance with instructions for writing the XSL conversion rule) shown in FIG. 12 is prepared and registered in the system in order to maintain a log for the accessing, for example, of information concerning orders for parts. According to this description, information for quantities and for delivery times for parts, represented by "GR Head", and the person to whom the information is disclosed are recorded. In FIG. 12, a portion "&Subject;" enclosed by an ellipse is a parameter (an access issuer in this case) that is designated when the enforcement process is begun. When the XSL processor 32 processes the description in which the "&Subject" portion is replaced with the actual company name and the description of the order information, a document in FIG. 13 to which the log is added is generated.

Following this, an explanation will be given for an example wherein the embodiment controls access by applying the constraints imposed by a time condition. When bidding or an auction takes place on the Internet, the granting of access permission in accordance with the condition, "This information may be read after a specific date at a specific time," must be strictly controlled. An explanation will be given to describe a policy that establishes the time at which access is permitted. This policy is called access permission under a time condition (Temporal Authorization). The policy description for such access permission is conventionally written as follows.

acl(AnyUserID, role(employee), doc(http://announce/bonus.xml), read):-get#time(T), T>"1999/06/03."

This means that "a user filling the 'employee' role has the 'read' right for 'http://announce/bonus.xml' after Jun. 3, 1999." In this case, the system term "get#time" obtains the current time, and if the current time is later than Jun. 3, 1999, the condition is established and the 'employee' can be granted the 'read' right for the 'bonus.xml'.

When access permission is controlled under this condition, however, the security of the access control system depends on the value held by the system clock of the server. For example, if a system manager should intentionally change the system clock of the server that controls the access, the "employee" would be able to "read" the "bonus.xml" at a time whereat he or she does not have the "read" right. Even when "read" accesses are maintained in a log, if the value held by the system clock is used to determine the access time, an access that is illegal relative to the time-limited access permission control can not be detected. Further, it tends to be assumed that access control at the OS level is performed in accordance with the system clock of the server. However, for granting the above permission, the assumption of the access under the time condition at the OS level is not required.

In the example, whether or not the above embodiment is used for access permission under a time condition, the policy description for access permission is written as follows.

acl(user(ID), role(employee), doc(http://announce/bonus.xml), read) :- status(timestamp (S, T)), verify#signature(S), T>"1999/06/03."

In accordance with the policy description, the access control system 100 performs the following process for each module.

First, the policy evaluation module 10 evaluates the policy description. Assume that the following rules are written concerning "status(timestamp(S, T))."
status(timestamp(S, T)) :- timestamp(S, T).
status(timestamp(S, T)) :-get#timestamp(S, T), makelog(timestamp(S, T)).

Since the time stamp data "timestamp(S, T)" have not yet been written to the resource document 40, the first rule of the "status" fails. The second rule is employed, and the access is permitted under conditions "get#timestamp(S, T)" and "makelog(timestamp(S, T)). Since verify#signature(S) and T>"1999/06/03" can not be evaluated by the policy evaluation module 10, access is also permitted under the condition. Finally, get#timestamp(S, T), makelog(timestamp(S, T)), verify#signature(S) and T>"1999/06/03" are defined as the external conditions 113, which are then transmitted by the policy evaluation module 10 to the enforcement function verification module 20.

The enforcement function verification module 20 examines the enforcement modules 30 to determine whether there is one that can evaluate or establish the external conditions. In this case, a table for the enforcement function verification module 20 is as shown in FIG. 14. The table in FIG. 14 shows the presence/absence of an enforcement module 30 that can process the contents represented by the Condition Expression, and the Component name of the enforcement module 30 that can process the contents. In the table in FIG. 14, makelog/1 means the "makelog" term of argument 1, and "formula#expression" means a formula expression including four rules of arithmetics. It is apparent from the table that all the condition portions for granting access permission under the condition can be processed by the enforcement module 30. Thus, [timestamp#processor, get#timestamp(S, T)], [log#processor, makelog(timestamp(S, T)], [signature#processor, verify#signature(S)], and [formula#processor, T>"1999/06/03"] are transmitted as enforcement instructions 121 by the enforcement function verification module 20 to the enforcement module 30.

The enforcement module 30 performs the processing in accordance with each of the enforcement instructions 121. Each process will now be described.

Process for get#timestamp(S, T)

The time stamp processor performs the process for get#timestamp. The following enforcement program is written to the time stamp processor.
get#timestamp(S, T) :- get#trust(timestamp, C), get#timestamp(C, T, S).

get#trust/2 is a term for extracting the "trust" description from the data file 210. Assume that the following "trust" description is included in the original document.
trust(timestamp, "http://www.surety.com").

This means that for the document "surety" is trusted as the "timestamp." As a result of the search of the document 141 from the data file 210, "http://www.surety.com" is allocated for the variable C in "get#trust." Then, in accordance with the "get#timestamp" term, the time stamp S for the time T is obtained from the Surety Timestamp Service. As a result, the first condition of the enforcement instructions 121 is established. In this embodiment, Timestamp Service is not limited to Surety, and any service for the original document that can be trusted can be written in.

Process for makelog(timestamp(S, T))

For "makelog" the process is performed by the log processor. The log processor issues the access request 130 to write the following log.
acl(sysl, role(system), doc(http://announce/bonus.xml#log), write)

Whether the log can be written is determined by again evaluating the policy description. When the access control system 100 has the right to write a log, access of the enforcement module 30 is permitted by the policy evaluation module 10. Thus, "makelog" writes the time stamp "log(timestamp(signature#value, 1999/06/04)).

Process for verify#signature(S)

The process for "verify#signature" is performed by a signature processor. The signature value of the time stamp is examined, and if it is Valid, "true" (correct signature) is returned, while if it is Invalid, "false" (incorrect signature) is returned. It should be noted that the signature value of Surety is Valid.

Process for T>"1999/06/03"

The formula expression is performed by the form processor. T is the value of the time held by the time stamp, i.e., 1999/06/04. Since T>"1999/06/03" is established, "true" (correct form) is returned.

Through the above processing, the enforcement instructions 121, get#timestamp(S, T), makelog(timestamp(S, T)), verify#signature(S() and T>"1999/06/03," that are transmitted by the enforcement function verification module 20 to the enforcement module 30 are all true. Thus, all the conditions acl(user(ID), role(employee), doc(http://announce/bonus.xml), read), which are requested by the policy evaluation module 10, are established.

An explanation will now be given for the resolving, under a time condition, of an access permission problem that was first described. When in the above example access is permitted, the value of the time stamp is always added to the log area of the original document. The value of the time stamp indicates that the data was generated at a predetermined time, and the presence of the time stamp value in the log area indicates that the current time is always later than the time stamp time. Therefore, if the system manager changes the system clock value of the policy evaluation module 10 or the enforcement module 30, a correct examination of the time condition can be performed by referring to the time stamp value.

As is described above, according to the access control provided by the present invention, upon the receipt of an access request, not only can whether or not an access should be permitted be determined, but also access permission under a condition whereby an access is permitted if a specific condition is established can also be evaluated. Further, when it is requested that a condition that is to be evaluated for access permission under a condition establish a different condition, the different condition can also be currently evaluated.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An access control system comprising:
   a resource document in which a policy description is stored that is associated with data stored in a data file;
   policy evaluation means for receiving an external request for accessing said data file, for extracting, from said resource document, said policy description that is associated with target data for said access request, said policy description including an existing condition, and for evaluating said policy description to determine whether or not said access request is to be permitted using the existing condition;
   wherein said policy evaluation means generates an external condition when the existing condition is such that said policy description can not be evaluated using information available to the policy evaluation means, the external condition being generated to facilitate an access determination responsive to receipt of the external request;
   enforcement function verification means for, when an existing condition is such that said policy description can not be evaluated using only the information included in said policy evaluation means, automatically determining whether said external condition can be evaluated or can be established; and
   enforcement means for evaluating or establishing said external condition when in accordance with said enforcement function verification means, the external condition is capable of being evaluated or established.

2. The access control system according to claim 1, wherein a plurality of said enforcement means are provided in accordance with the evaluation or the establishment of said existing condition, which can not be evaluated using only said information included in said policy evaluation means; and wherein, when said plurality of enforcement means are provided, said enforcement function verification means further determines whether the external condition that one of said enforcement means has received from said policy evaluation means can be evaluated or established.

3. The access control system according to claim 1, wherein, when access of a different data portion is required in order to evaluate or establish the external condition that is determined by said enforcement function verification means can be evaluated or established, said enforcement means issues, to said policy evaluation means, a request to access said different data portion and upon the receipt of the access request from said enforcement means, as well as upon the receipt of an external access request, said policy evaluation means evaluates a policy description that is associated with data to be accessed.

4. The access control system according to claim 3, wherein said enforcement means includes:
   writing/alteration target detection means for detecting a data portion in said data file that is a target for writing or alteration, and for issuing an access request to said policy evaluation means; and
   writing/alteration execution means for, when in response to said access request access permission is received from said policy evaluation means, writing or altering said data portion, wherein said writing/alteration execution means prepares a desired function by using a plug-in.

5. An access control method, for receiving an external request for accessing a predetermined data file and for evaluating a policy description including an existing condition, said policy description associated with the data that are to be accessed to determine whether or not said access request is to be permitted using the existing condition, comprising:
   receiving an access request and obtaining a policy description that is associated with said data that are to be accessed;
   evaluating the existing a condition in said obtained policy description;
   generating an external condition when the existing condition cannot be evaluated using information used during said attempting to evaluate, the external condition being generated to facilitate an access determination responsive to receipt of the external request;
   automatically determining, when the existing a condition that can not be currently evaluated is present in said policy description, whether a process that satisfies said external condition is capable of being enforced;
   performing said process that satisfies said external condition when it is ascertained that said process is capable of being enforced; and employing, after said process that satisfies said external condition has been performed, the evaluation results for all the conditions in said policy description to determine whether or not said access that is requested is to be permitted.

6. The access control method according to claim 5, wherein said evaluating said existing conditions in said policy description includes:

comparing a parameter of said access request with a rule in said policy description, and detecting a matching rule;

evaluating condition portions in said rule that is detected; and when said condition portions of said rule can not be currently evaluated, collecting said condition portions and moving to a step at which whether a process for satisfying said condition portions is capable of being performed is determined.

7. The access control method according to claim 6, further comprising:

employing, when a plurality of rules that match said parameter of said access request are detected before the performance of said evaluating said condition portions of said rule in said policy description, a predetermined rule to determine a priority order for evaluating said rule.

8. The access control method according to claim 6, wherein said automatically determining whether said process that satisfies said external condition is capable of being performed includes:

receiving the set of said external conditions that have been generated at said evaluating said condition in said policy description, for said rule that can not be evaluated based only on information in said policy description, and extracting said external conditions separately;

determining whether a function has been prepared for performing a process that satisfies each of said external conditions; and calling said function for performing said process that satisfies said external condition when it is ascertained that said function has been prepared.

9. The access control method according to claim 8, wherein said performing said process that satisfies said external condition in said policy description includes:

employing said function that is called at said determining whether said process that satisfies said external condition in said policy description can be enforced, and detecting, based on said external condition, a data portion in a predetermined data file for writing or for alteration;

issuing a request for an access required for said writing or said alteration; and writing data to said data portion or changing said data portion upon the receipt of access permission in response to said request for said access that is required in order to perform said writing or said alteration.

10. A storage medium on which a program is stored that can be read by input means of a computer, said program permitting said computer to perform:

a process for receiving an access request to externally access a predetermined data file, and for obtaining a policy description that is associated with said data that are to be accessed, said policy description including an existing condition;

a process for evaluating the existing condition in said obtained policy description to determine whether or not said access request is to be permitted using the existing condition;

a process for generating an external condition when the existing condition cannot be evaluated using only information available to the process for evaluating, the external condition being generated to facilitate an access determination responsive to receipt of the access request;

a process for automatically determining, when the existing condition that can not be currently evaluated is present in said policy description, whether a process that satisfies said external condition is capable of being enforced;

a process for performing said process that satisfies said external condition when it is ascertained that said process that satisfies said external condition is capable of being enforced; and a process for employing, after said process that satisfies said external condition has been performed, the evaluation results for all the conditions in said policy description to determine whether or not said access that is requested is to be permitted.

11. The storage medium according to claim 10, wherein, in order to perform said process that satisfies said external condition, said program permits said computer to perform:

a process for employing said function that is called at said determining whether said process that satisfies said external condition can be enforced, and for detecting, based on said external condition, a data portion in a predetermined data file for writing or for alteration;

a process for issuing a request for an access required for said writing or said alteration; and a process for writing data to said data portion or changing said data portion upon the receipt of access permission in response to said request for said access that is required in order to perform said writing or said alteration.

12. A program transmission apparatus comprising:

storage means for storing a program that permits a computer to perform:

a process for receiving an access request to externally access a predetermined data file, and for obtaining a policy description including an existing condition, said policy description associated with said data that are to be accessed using the existing condition;

a process for evaluating the existing a condition in said obtained policy description;

a process for generating an external condition when the existing condition cannot be evaluated using only information available to the process for evaluating, the external condition being generated to facilitate an access determination responsive to receipt of the access request;

a process for automatically determining, when the existing condition that can not be currently evaluated is present in said policy description, whether a process that satisfies said external condition is capable of being enforced;

a process for performing said process that satisfies said external condition when it is ascertained that said process that satisfies said external condition is capable of being enforced;

a process for employing, after said process that satisfies said external condition has been performed, the evaluation results for all the conditions in said policy description to determine whether or not said access that is requested is to be permitted; and transmission means for reading said program from said storage means and transmitting said program.

13. The program transmission apparatus according to claim 12, wherein, in order to perform said process that satisfies said external condition, said program stored in said storage means permits said computer to perform:

a process for employing said function that is called at said determining whether said process that satisfies said external condition can be enforced, and for detecting, based on said external condition, a data portion in a predetermined data file for writing or for alteration;

a process for issuing a request for an access required for said writing or said alteration; and a process for writing data to said data portion or changing said data portion upon the receipt of access permission in response to said request for said access that is required in order to perform said writing or said alteration.

14. An access control system comprising:

means for storing a policy description including a condition whereby reading of information written by a single source is permitted when format conversion is possible;

means for, upon the receipt of a predetermined access request that matches said policy description, determining whether a function to establish said condition for said format conversion is included, and for, when it is ascertained that said function is included, calling and executing said function to establish said condition; and means for, when said function to establish said condition is executed, permitting an access in response to said access request.

15. An access control system comprising:

means for storing a policy description including a condition whereby reading of information is permitted when an electronic watermark is to be embedded in a document to be accessed;

means for, upon the receipt of a predetermined access request that matches said policy description, determining whether a function for embedding an electronic watermark to establish said condition is included, and for, when it is ascertained that said function is included, calling and executing said function to establish said condition; and means for, when said function to establish said condition is executed, permitting an access in response to said access request.

16. An access control system comprising:

means for storing a policy description including a condition whereby accessing of a target document is permitted when an access history is to be written to said target document;

means for, upon the receipt of a predetermined access request that matches said policy description, determining whether a function for writing said access history to said target document to establish said condition is included, and for, when it is ascertained that said function is included, calling and executing said function to establish said condition; and means for, when said function to establish said condition is executed, permitting an access in response to said access request.

17. The access control system according to claim 16, wherein said function for writing said access history to said document further comprises means for recurrently issuing requests to access a document to write said access history.

18. An access control system comprising:

means for storing a policy description including a condition whereby accessing of a target document is permitted when a time stamp of an access is to be written as an access history to said target document;

means for, upon the receipt of a predetermined access request that matches said policy description, determining whether a function for writing said time stamp as said access history to said target document to establish said condition is included, and for, when it is ascertained that said function is included, calling and executing said function to establish said condition; and means for, when said function to establish said condition is executed, permitting an access in response to said access request.

19. An access control system comprising:

a resource document in which a policy description is stored that is associated with data stored in a data file;

policy evaluation means for receiving an external request for accessing said data file, for extracting, from said resource document, said policy description that is associated with target data for said access request, said policy description including an existing condition, and for evaluating said policy description to determine whether or not said access request is to be permitted; using the existing condition, and wherein said policy evaluation means generates an external condition when the existing condition cannot be evaluated using only information available to the policy evaluation means, the external condition being generated to facilitate an access determination responsive to receipt of the external request; and enforcement function verification means for performing another process to automatically determine whether said external condition can be evaluated or can be established.

* * * * *

UNITED STATES PATENT AND TRADEMARK OFFICE
CERTIFICATE OF CORRECTION

PATENT NO. : 6,647,388 B2
DATED : November 11, 2003
INVENTOR(S) : Numao et al.

It is certified that error appears in the above-identified patent and that said Letters Patent is hereby corrected as shown below:

Column 20,
Line 61, delete the word "a" before the word "condition"

Column 22,
Line 49, delete the word "a" before the word "condition"

Signed and Sealed this

Third Day of February, 2004

JON W. DUDAS
*Acting Director of the United States Patent and Trademark Office*